US012475813B2

(12) United States Patent
Nejad et al.

(10) Patent No.: US 12,475,813 B2
(45) **Date of Patent: *Nov. 18, 2025**

(54) POP-UP DISPLAY STRUCTURE

(71) Applicant: LOVEPOP, INC., Boston, MA (US)

(72) Inventors: Dariush S. Nejad, Somerville, MA (US); Jozef Karpiel, Cambridge, MA (US); Robin S. Rose, Cambridge, MA (US); Mansi Monhani, Jamaica Plain, MA (US); Xinzhi Jiao, Quincy, MA (US); Jonathan Aoun, Saugus, MA (US)

(73) Assignee: LOVEPOP, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,186

(22) Filed: Apr. 2, 2024

(65) Prior Publication Data

US 2024/0242635 A1 Jul. 18, 2024

Related U.S. Application Data

(63) Continuation of application No. 17/479,466, filed on Sep. 20, 2021, now Pat. No. 11,967,254, which is a continuation of application No. 16/561,286, filed on Sep. 5, 2019, now Pat. No. 11,127,316.

(60) Provisional application No. 62/727,304, filed on Sep. 5, 2018.

(51) Int. Cl.
*B42D 15/04* (2006.01)
*G09F 1/06* (2006.01)

(52) U.S. Cl.
CPC ............. *G09F 1/06* (2013.01); *B42D 15/042* (2013.01)

(58) Field of Classification Search
CPC ... G09F 1/06; G09F 1/08; G09F 1/065; G09F 1/10
See application file for complete search history.

(56) References Cited

U.S. PATENT DOCUMENTS

| | | | | | |
|---|---|---|---|---|---|
| 2 | A * | 7/1836 | Goulding | D01G 21/00 | 57/58.49 |
| 2,362,230 | A * | 11/1944 | Ziemmerman | B65D 5/302 | 229/110 |
| 4,234,148 | A * | 11/1980 | Maddestra | G09F 1/14 | 248/459 |
| 4,620,842 | A * | 11/1986 | Wang | G09B 27/08 | 434/137 |
| 4,869,702 | A * | 9/1989 | Derby, III | A63H 3/14 | 446/329 |

(Continued)

*Primary Examiner* — Shin H Kim
(74) *Attorney, Agent, or Firm* — Polsinelli PC

(57) ABSTRACT

A pop-up card includes an erectable pop-up display structure that can be easily removed from the card to be displayed. The pop-up card is foldable between closed and opened positions. The card includes a slot therein for holding the pop-up display structure. The pop-up display structure comprises a plurality of intersecting slice-form elements mounted on a foldable base. At least a portion of the foldable base is removably inserted in the slot such that when the card is closed, the foldable base is folded and the pop-up display structure is in a flattened state. When the card is opened, the foldable base is unfolded and the pop-up display structure is in an erected 3-D state. The pop-up display structure can be slid out of the slot in the card and displayed when desired.

20 Claims, 23 Drawing Sheets

(56) References Cited

U.S. PATENT DOCUMENTS

| | | | | | |
|---|---|---|---|---|---|
| D662,543 | S * | 6/2012 | Dennis | D19/1 | |
| 9,524,658 | B1 * | 12/2016 | Wise | B42D 15/042 | |
| 9,601,033 | B2 * | 3/2017 | Wise | G09F 1/06 | |
| 9,842,516 | B2 * | 12/2017 | Yeh | B44C 5/00 | |
| 11,084,313 | B2 * | 8/2021 | Nejad | B42D 15/042 | |
| 11,127,316 | B2 * | 9/2021 | Nejad | B42D 15/045 | |
| 11,238,758 | B2 * | 2/2022 | Wallen | G09F 1/06 | |
| 11,417,243 | B2 * | 8/2022 | Bucco | G09F 1/06 | |
| 11,450,239 | B2 * | 9/2022 | Adair | G09F 1/06 | |
| 2005/0132621 | A1 * | 6/2005 | Bostick, II | G09F 1/06 | 40/124.08 |
| 2007/0017133 | A1 * | 1/2007 | Crowell | G09F 1/06 | 40/610 |
| 2007/0293118 | A1 * | 12/2007 | Prescott | A63H 33/38 | 446/148 |
| 2015/0332611 | A1 * | 11/2015 | Yeh | B44C 5/06 | 40/124.08 |
| 2016/0365009 | A1 * | 12/2016 | Wise | B42D 15/042 | |
| 2016/0365010 | A1 * | 12/2016 | Wise | B42D 15/042 | |
| 2017/0148358 | A1 * | 5/2017 | Wise | G09F 1/06 | |
| 2020/0070562 | A1 * | 3/2020 | Nejad | B42D 15/045 | |
| 2020/0074887 | A1 * | 3/2020 | Nejad | G09F 1/065 | |
| 2022/0005379 | A1 * | 1/2022 | Nejad | G09F 1/065 | |

* cited by examiner

POP-UP DISPLAY STRUCTURE

CROSS REFERENCE TO RELATED APPLICATIONS

This application is a continuation of U.S. patent application Ser. No. 17/479,466, filed on Sep. 20, 2021, and entitled "POP-UP DISPLAY STRUCTURE," which is a continuation of U.S. patent application Ser. No. 16/561,286, filed on Sep. 5, 2019, and entitled "POP-UP DISPLAY STRUCTURE,", which claims priority to U.S. Provisional Patent Application No. 62/727,304, filed on Sep. 5, 2018, and entitled "POP-UP DISPLAY STRUCTURE." Each of these applications is hereby incorporated by reference in its entirety herein.

BACKGROUND

The present application relates generally to pop-up display structures.

BRIEF SUMMARY

In accordance with one or more embodiments, a pop-up card is disclosed that includes an erectable pop-up display structure that can be easily removed from the card to be displayed. The pop-up card is foldable between closed and opened positions. The card includes a slot therein for holding the pop-up display structure. The pop-up display structure comprises a plurality of intersecting slice-form elements mounted on a foldable base. At least a portion of the foldable base is removably inserted in the slot such that when the card is closed, the foldable base is folded and the pop-up display structure is in a flattened state. When the card is opened, the foldable base is unfolded and the pop-up display structure is in an erected 3-D state. The pop-up display structure can be slid out of the slot in the card and displayed when desired.

In accordance with one or more embodiments, a pop-up display structure that is removed from the card can be mounted on a pedestal to be displayed. The pedestal supports the pop-up display structure in the 3-D state. The pedestal includes a slot configured and arranged to receive at least a portion of the base of the pop-up display structure such that the base is maintained in the unfolded position.

In one or more alternate embodiments, the foldable base of the pop-up display structure is configured to maintain the pop-up display structure in a stable 3-D state after the pop-up display structure has been removed from the card. In such embodiments, no pedestal is needed to display the pop-up display structure in the 3-D state.

If desired, a removed pop-up display structure can be returned to its original position in the card by sliding the base of the pop-up display structure back into the slot of the card, where it maintains its original functionality, i.e., the pop-up display structure moves between a flattened state and an erected 3-D state when the card is closed and opened, respectively.

A decorative display item is disclosed in accordance with one or more further embodiments. The display item comprises an erectable pop-up display structure. The pop-up display structure comprises a plurality of intersecting slice-form elements mounted on a foldable base such that pop-up display structure is in a collapsed state when the base is in a folded position and in an erected 3-D state when the base is in an opened position. In one or more embodiments, a pedestal supports the pop-up display structure in the 3-D state. The pedestal includes a slot configured and arranged to receive at least a portion of the base such that the base is maintained in the opened position. In one or more alternate embodiments, the foldable base of the pop-up display structure is configured to maintain the pop-up display structure in the 3-D state.

A decorative display item is disclosed in accordance with one or more embodiments. The display item comprises an erectable pop-up display structure that includes a plurality of intersecting slice-form elements movable between a collapsed state and an erected 3-D state. The pop-up display structure includes locking features configured to maintain the pop-up display structure in the 3-D state. The locking features include tabs that are separated by a slot. The locking features can be folded into the bottom of the pop-up display structure such that the slots each receive one of the intersecting slice form elements and the tabs engage adjacent slice form elements to inhibit the slice form elements from collapsing, thereby maintaining the pop-up display structure in the 3-D state.

A decorative display item is disclosed in accordance with one or more embodiments. The display item comprises an erectable pop-up display structure that includes a plurality of intersecting slice-form elements movable between a collapsed state and an erected 3-D state. The pop-up display structure includes locking features configured to maintain the pop-up display structure in the 3-D state. The locking features are each connected at a first end to the bottom of the pop-up display structure. The opposite second free end of each locking feature includes a tip that is designed to be received and held in an opening in the first end of the other locking feature. Each locking feature includes a slot in a middle portion thereof, which interlocks with the slot in the other locking feature forming a pivot enabling the locking features to be unfolded in scissor-like fashion from a vertical position when the pop-up display structure is in the collapsed state to a horizontal position when the pop-up display structure is in the 3-D state. When in the horizontal position, the tip at the free end of each locking feature is held in the opening of the other locking feature to securely maintain the pop-up display structure in the 3-D state.

BRIEF DESCRIPTION OF THE DRAWINGS

Like or identical reference numbers are used to identify common or similar elements.

DETAILED DESCRIPTION

Pop-up cards are greeting cards that include an erectable pop-up display structure that unfolds from a flattened state when the card is closed to an erected 3-D state when the card is opened.

Various embodiments disclosed herein relate to pop-up display structures that can be mounted on a pedestal to be displayed or that include a base that is configured to maintain the pop-up display structure in a 3-D state when displayed. In accordance with one or more embodiments, the pop-up display structures can be slidably removed from pop-up cards. In other embodiments, the pop-up display structures are independently sold and not part of a pop-up card.

FIGS. 1-7 illustrate one example of a pop-up card 10 having a removable pop-up display structure 12 in accordance with one or more embodiments.

Figure 1:
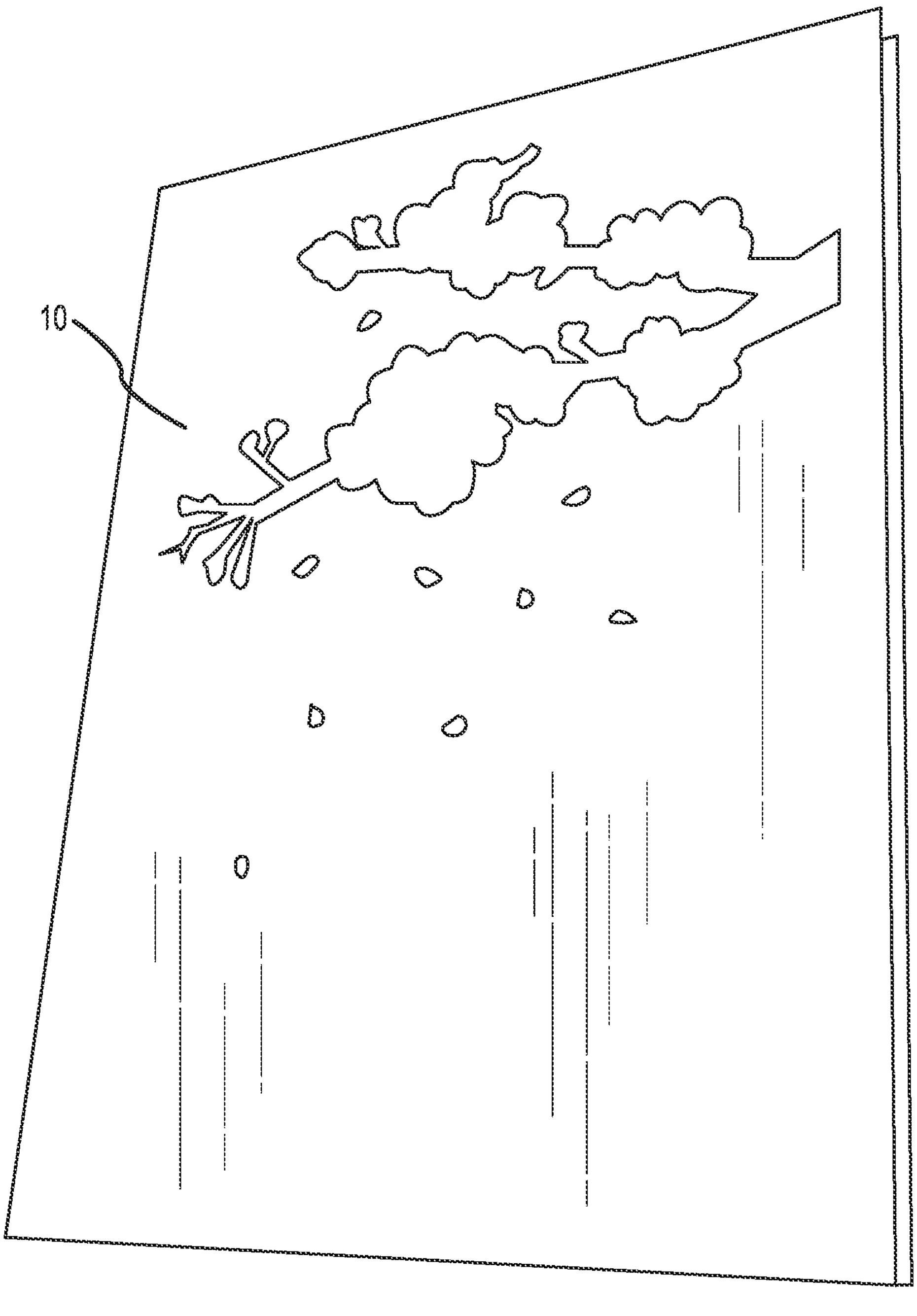
FIGS. 1-7 illustrate one example of a pop-up card having a removable pop-up display structure in accordance with one or more embodiments.
Figure 2:
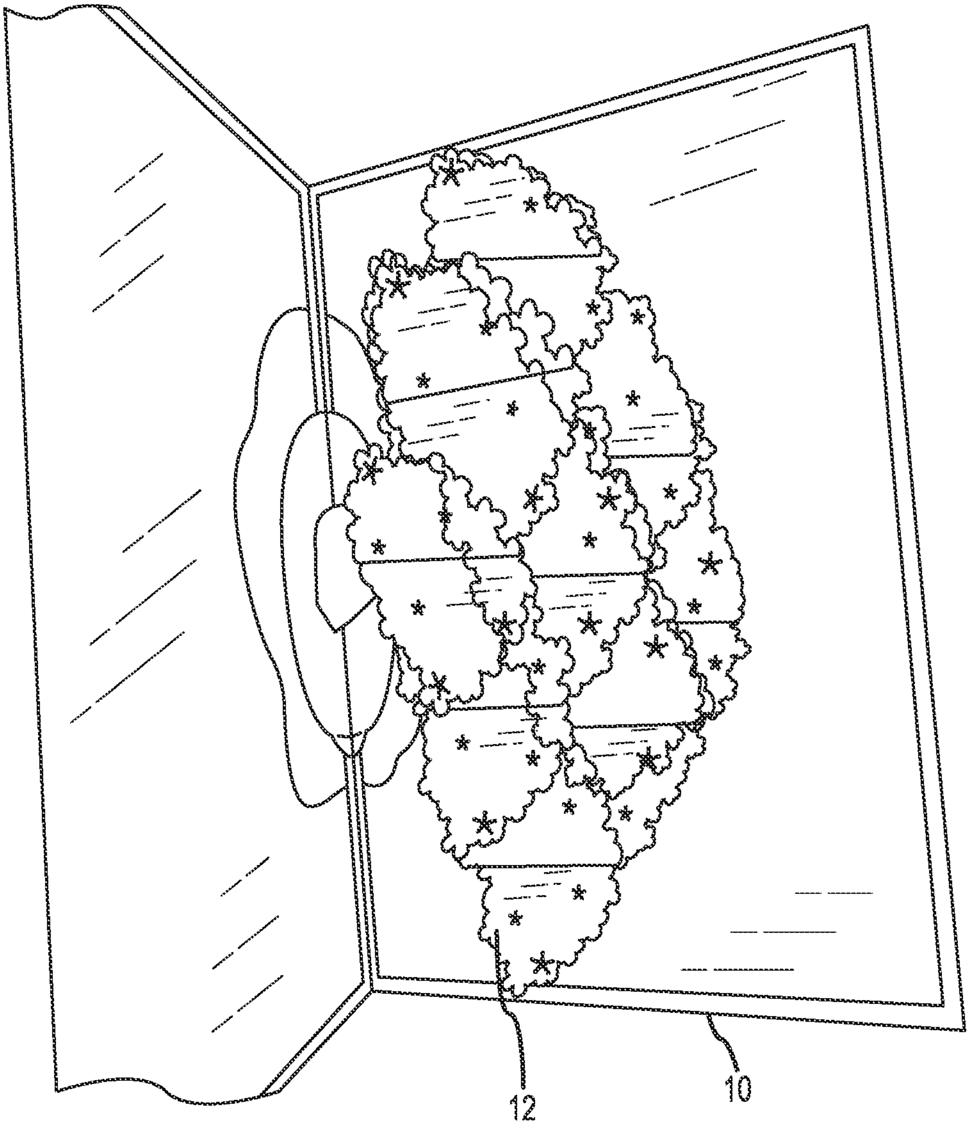
Figure 3:
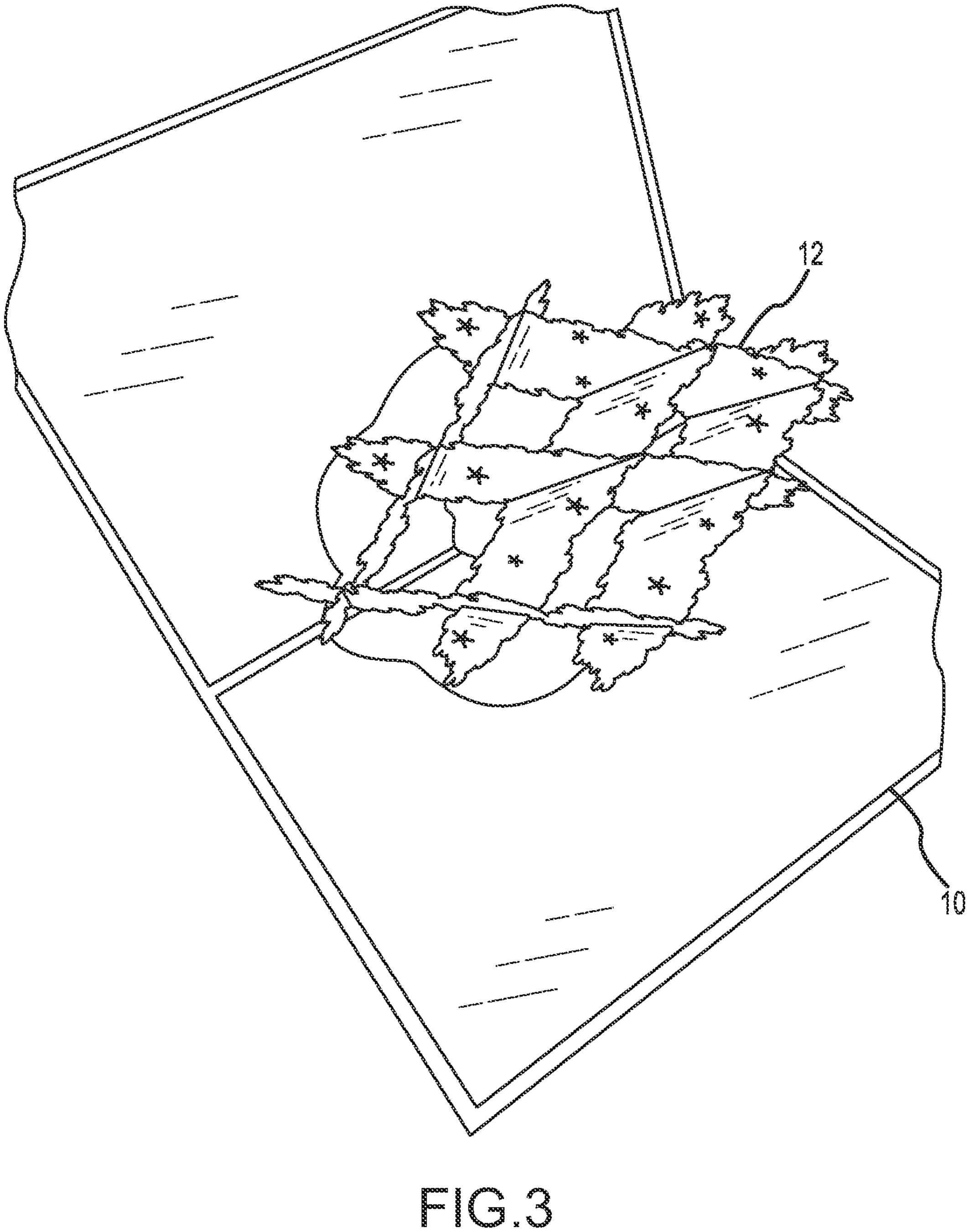
Figure 4:
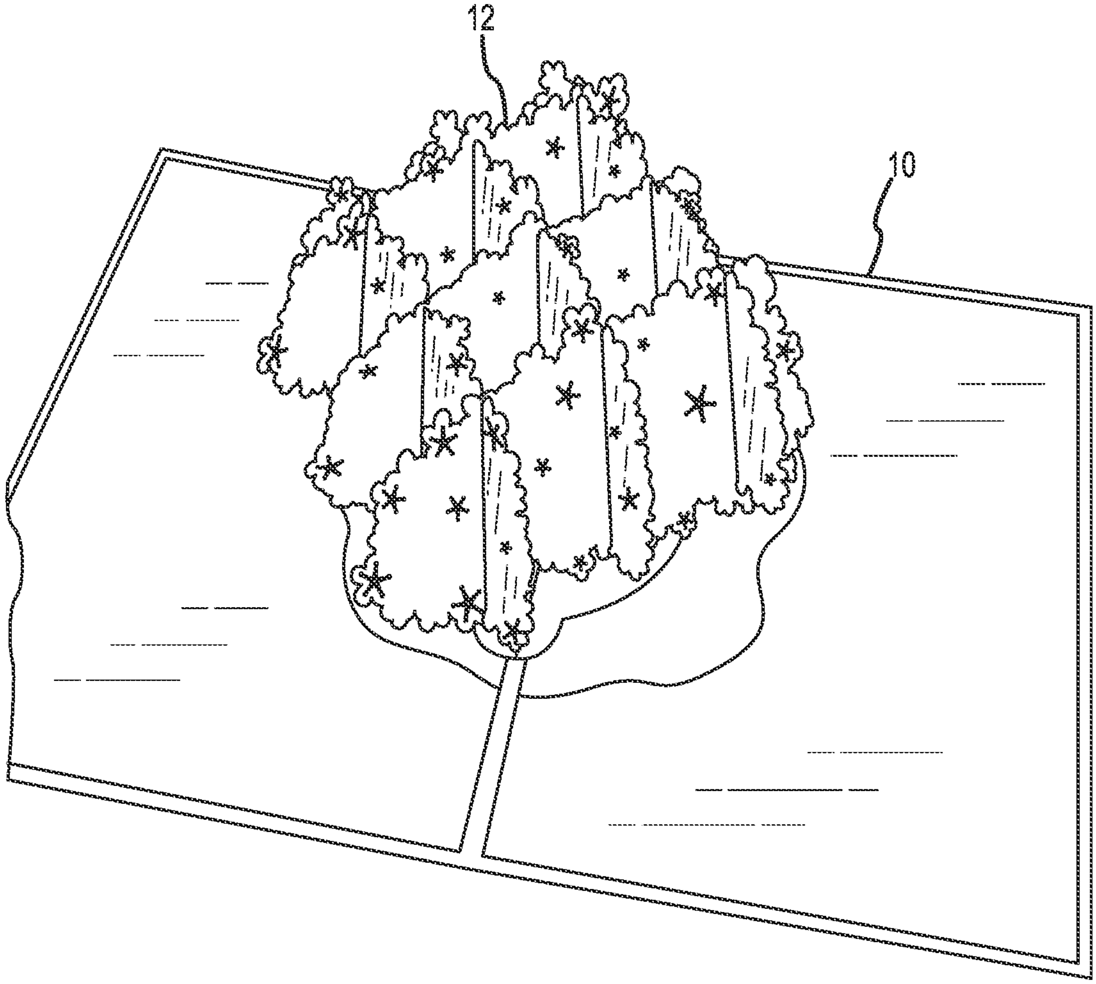

FIG. 1 shows the pop-up card 10 in a closed position. FIGS. 2 and 3 show the card 10 in a partially opened position, and FIG. 4 shows the card 10 in an opened position. The card 10 includes an erectable pop-up display structure 12 comprising a plurality of intersecting slice-form elements 14. As the card 10 is opened, the pop-up display structure 12 is unfolded from a flattened state (FIG. 1) to an erected 3-D state (FIG. 4).

Figure 5:
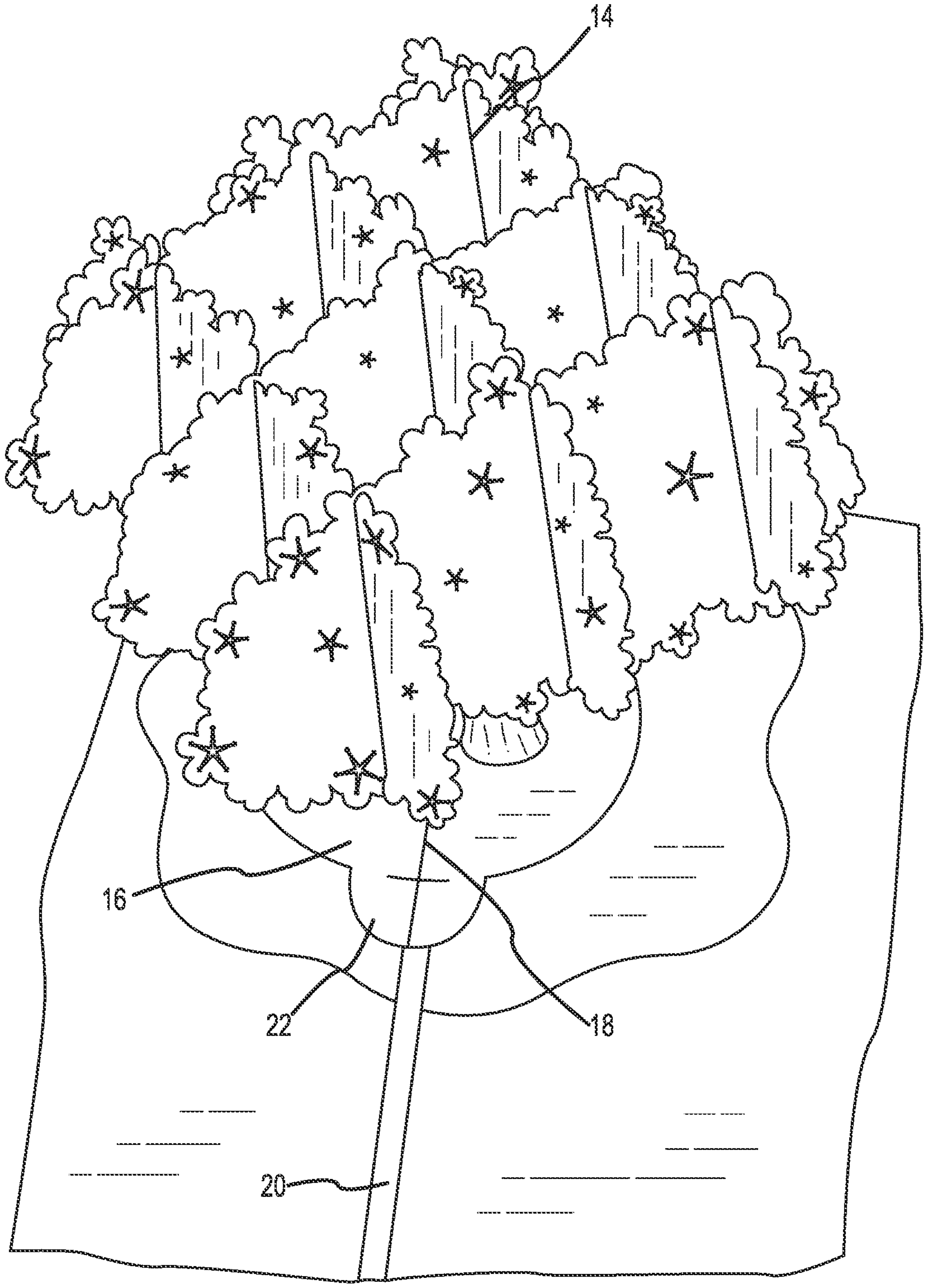

FIG. 5 shows the pop-up display structure 12 in greater detail. The pop-up display structure 12 is made from a plurality of intersecting slice-form elements 14. U.S. Pat. No. 9,524,658, which is incorporated by reference herein, illustrates various examples of pop-up cards and the construction of pop-up display structures from slice-form elements.

As shown in FIG. 5, the plurality of intersecting slice form elements 14 are mounted on a foldable base 16. The base 16 is foldable along a fold line 18 that coincides with the crease or fold line 20 of the card 10. Thus, as the card 10 is opened and closed, the base 16 is unfolded and folded, respectively. In this example, the base 16 is circular in shape and includes a tab 22, which can be grasped by a user to slide the pop-up display structure 12 out of the card 10.

Figure 6:
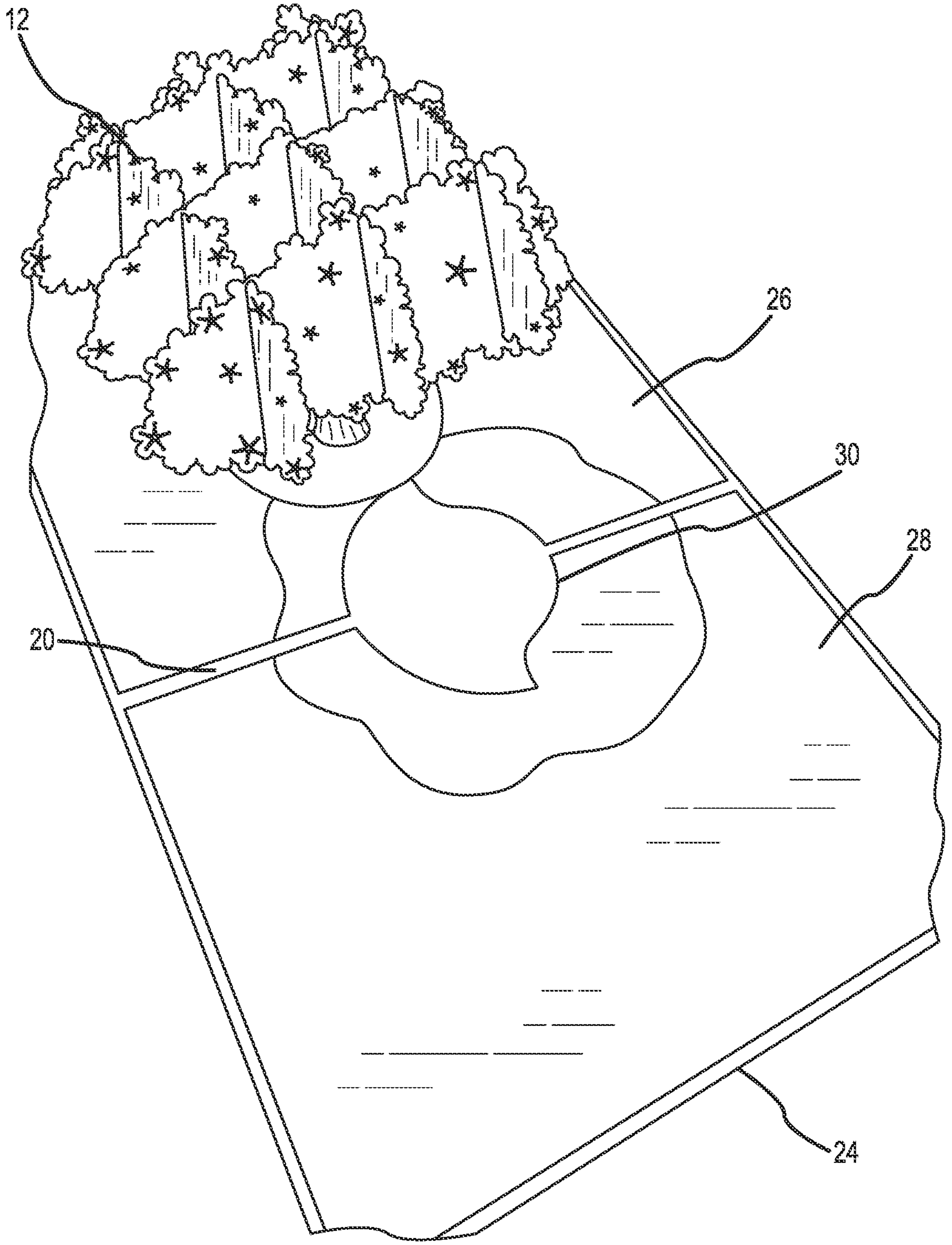
Figure 7:
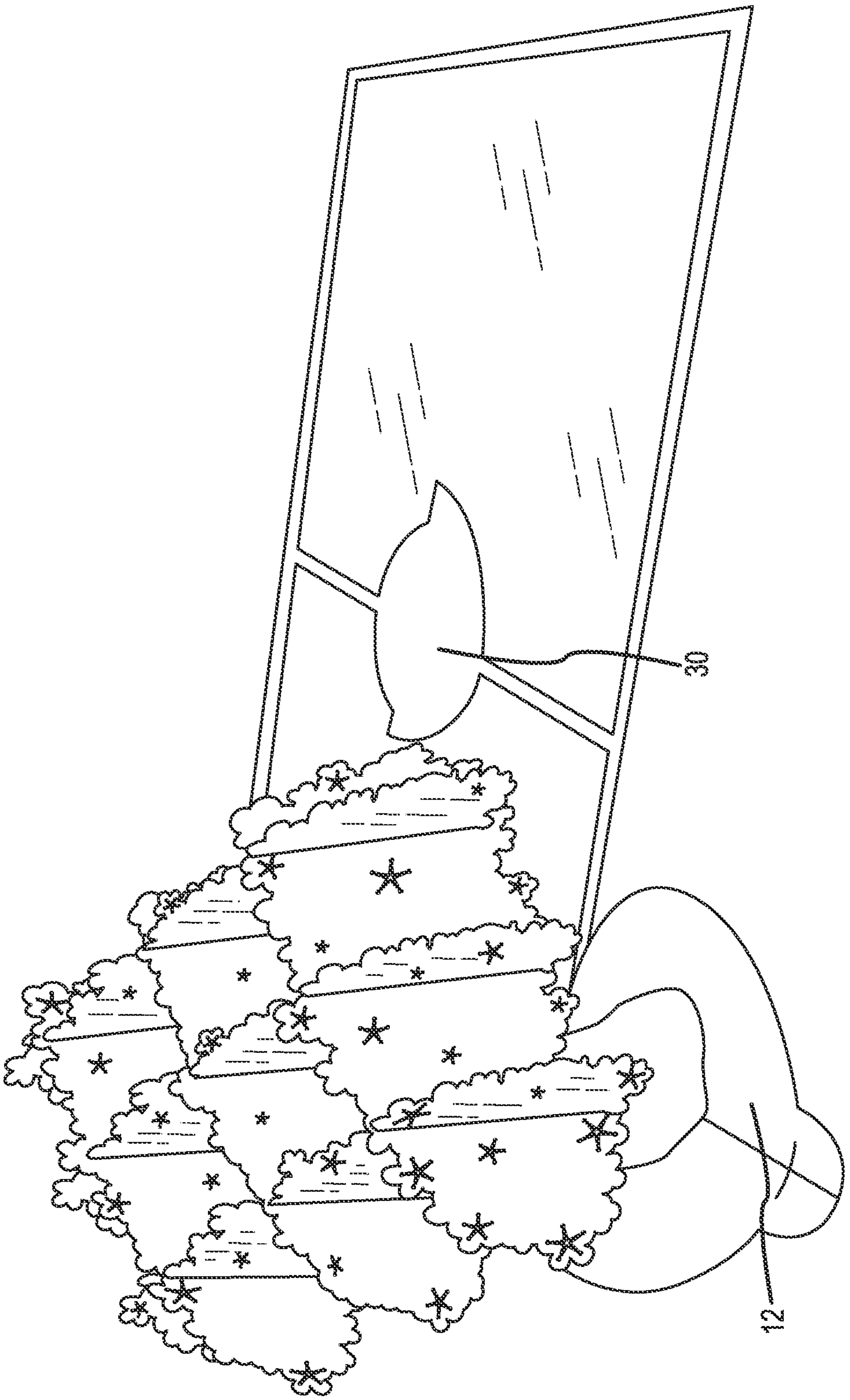

As shown in FIG. 6, the card 10 comprises a sheet 24 and two panels 26, 28 secured to the inner side of the sheet 24 on opposite sides of the card fold line 20. The two panels 26, 28 each include a cutout portion forming an opening to a slot 30 between the panels 26, 28 and the sheet 24. The slot 30 is configured and arranged for receiving an outer portion of the base 16 of the pop-up display structure 12. In this way, the pop-up display structure 12 is part of the pop-up card 10 when the card 10 is opened and closed. The pop-up display structure 12 can be slid out of the slot 30 when desired as shown in FIGS. 6 and 7 to be displayed separately from the rest of the card 10.

Figure 8:
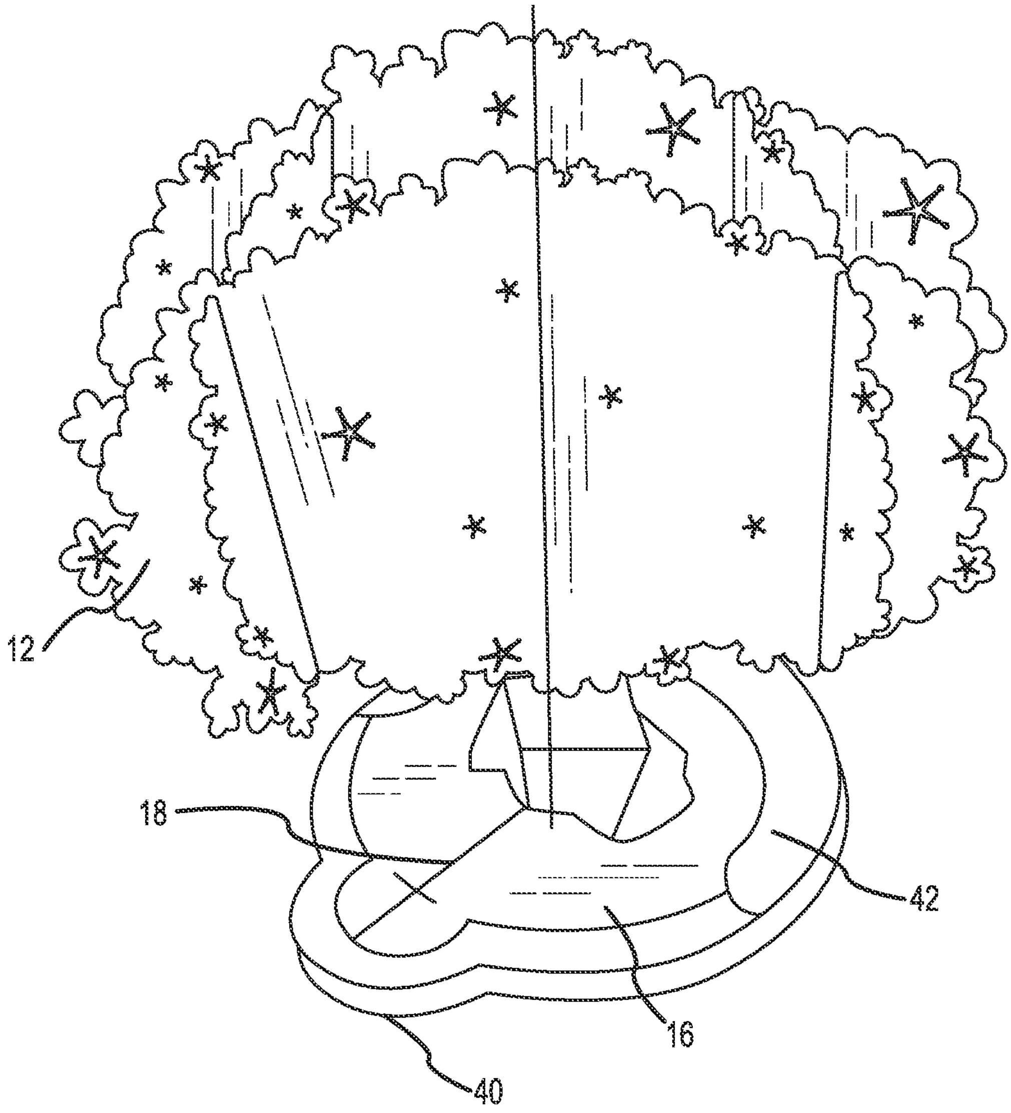
FIG. 8 illustrates an example of a pop-up display structure mounted on a pedestal to be displayed in accordance with one or more embodiments.

To increase the stability of the pop-up display structure 12 in the 3-D state, i.e., to prevent it from folding, the pop-up display structure 12 can be held in a pedestal 40 for display in accordance with one or more embodiments. FIG. 8 illustrates the pop-up display structure 12, which has been removed from the pop-up card 10, and mounted on a pedestal 40. The pedestal 40 includes a slot 42 in which an outer portion of the base 16 of the pop-up display structure 12 can be slid. The pedestal 40 keeps the base 16 from folding along the base fold line 18, thereby maintaining the pop-up display structure 12 in the 3-D state.

Figure 10:
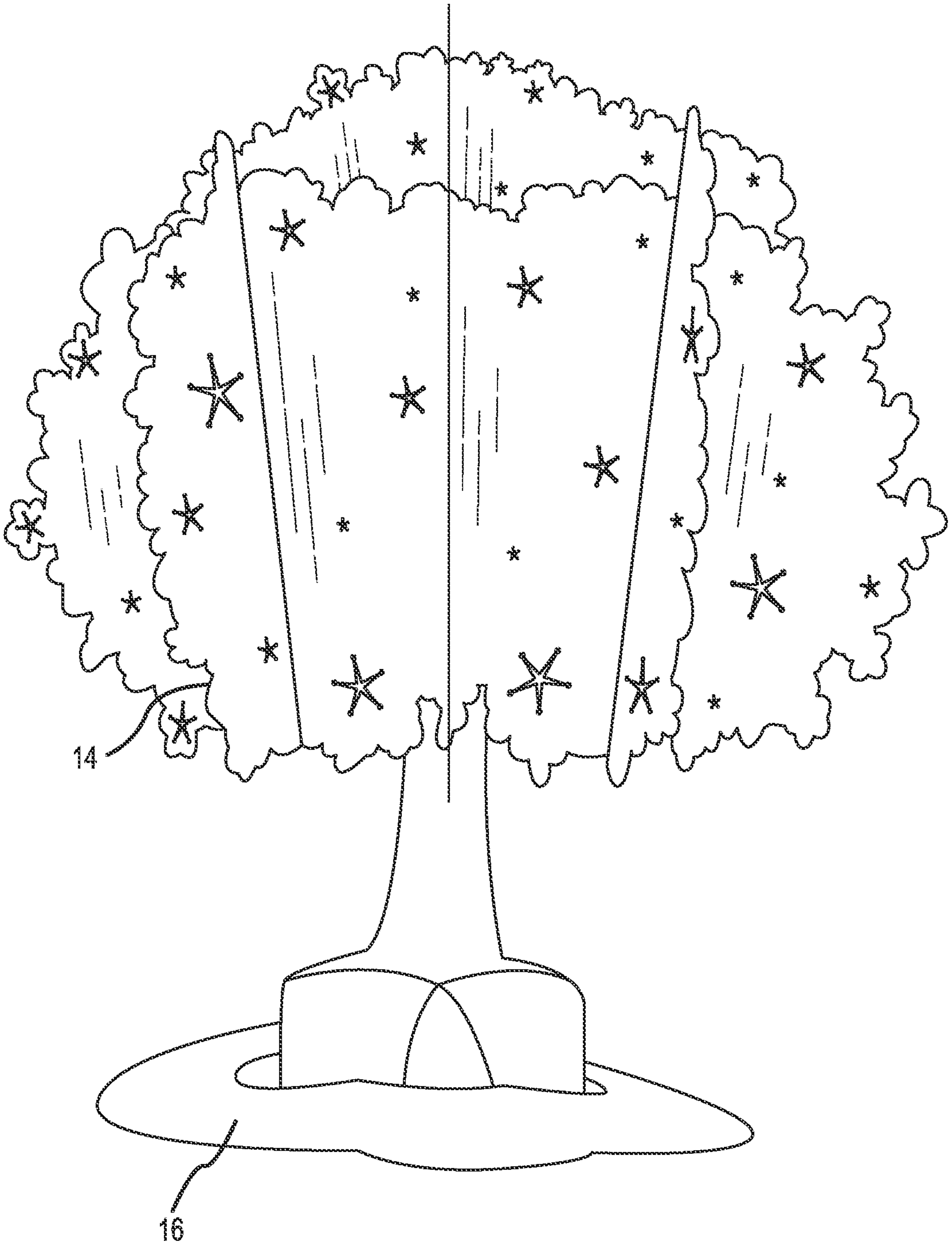
FIGS. 10 and 11 illustrate a pop-up display structure having a base configured to maintain the pop-up display structure in the 3-D state in accordance with one or more embodiments.
Figure 11:
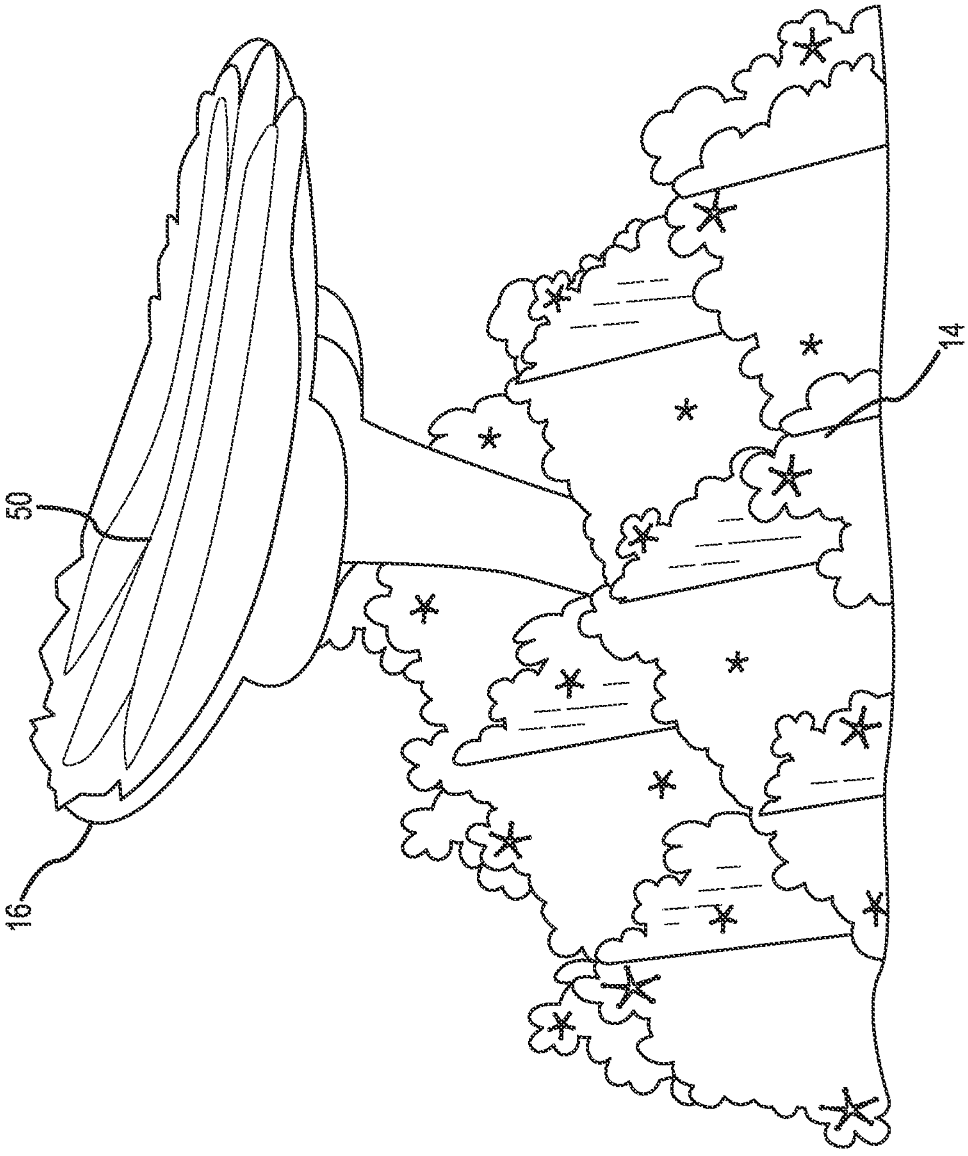

In accordance with one or more alternate embodiments, the foldable base 16 of the pop-up display structure 12 is configured to maintain the pop-up display structure 12 in the 3-D state when the pop-up display structure 12 is removed from the card 10. In one or more embodiments, the pop-up display structure 12 is resiliently biased toward an unfolded position to maintain the pop-up display structure 12 in the 3-D state when the pop-up display structure 12 is removed from the card 10. In one exemplary embodiment as shown in FIGS. 10 and 11, the bottom of the foldable base 16 is at least partially covered by an elastic material 50 evenly applying tension to the foldable base 16 to maintain the foldable base 16 in an unfolded position. No pedestal is therefore needed to display the pop-up display structure 12 in a stable 3-D state.

If desired, a removed pop-up display structure 12 can be returned to its original position in the card 10 by sliding the base 16 of the pop-up display structure 12 back into the slot 30 of the card 10, where it maintains its original functionality, i.e., the pop-up display structure 12 moves between a flattened state and an erected 3-D state when the card 10 is closed and opened, respectively.

The pop-up card 10 thereby allows users to quickly and easily remove a pop-up display structure 12 from the card without damaging the card. The pop-up display structure 12 can be securely maintained in its 3-D state for display.

Figure 9:
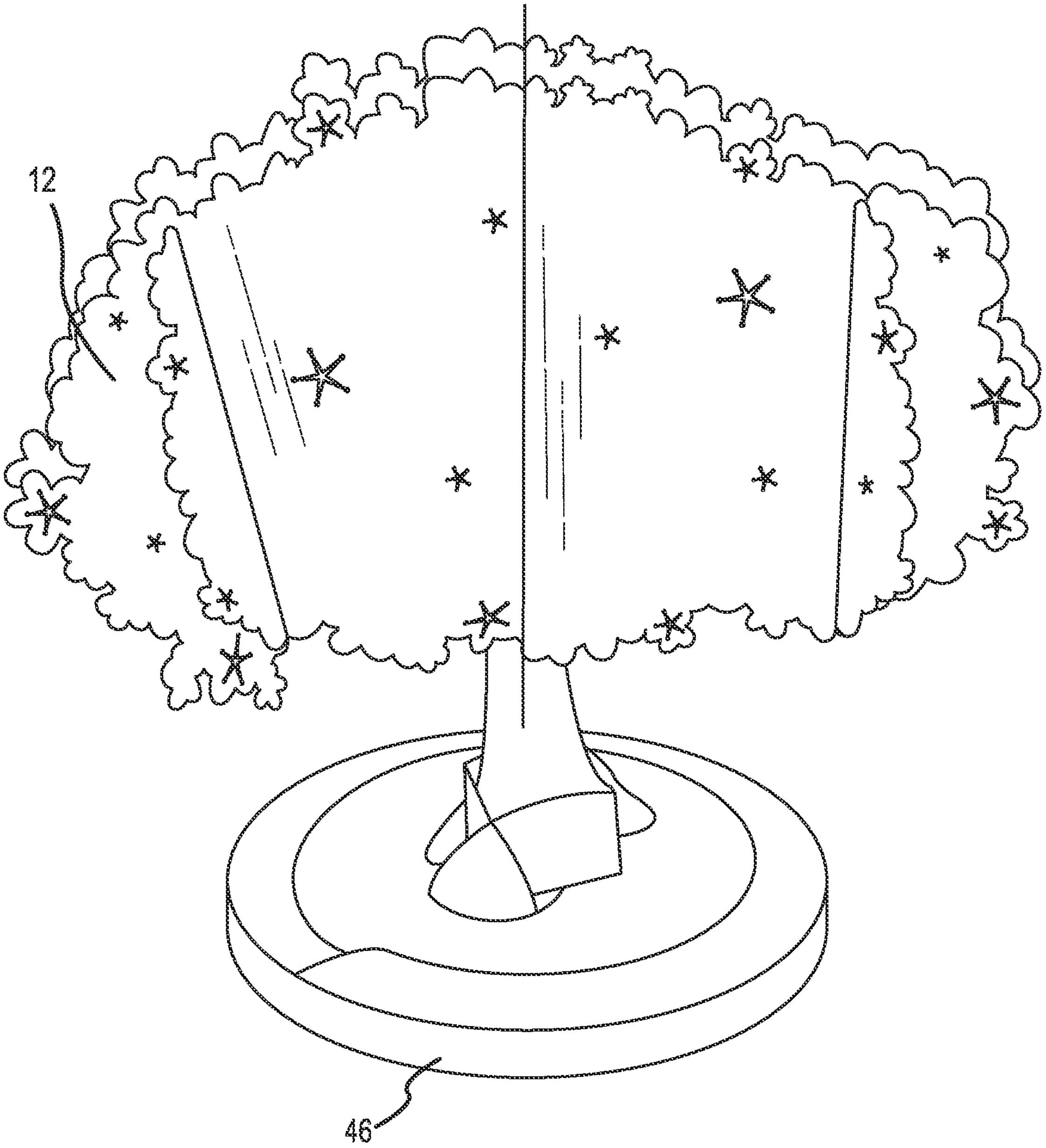
FIG. 9 illustrates an example of a pop-up display structure that is not part of a pop-up greeting card mounted on a pedestal in accordance with one or more embodiments.

The pop-up display structure 12 need not be part of a pop-up card. FIG. 9, e.g., illustrates a pop-up display structure 12 having a base that is held in a slot of an exemplary pedestal 46.

FIGS. 12A-12G illustrate an example of a pop-up display structure (an ice cream cone) 60 having a base with locking features 61 that can be used to maintain the pop-up display structure 60 in a stable 3-D state in accordance with one or more embodiments.

Figure 12A:
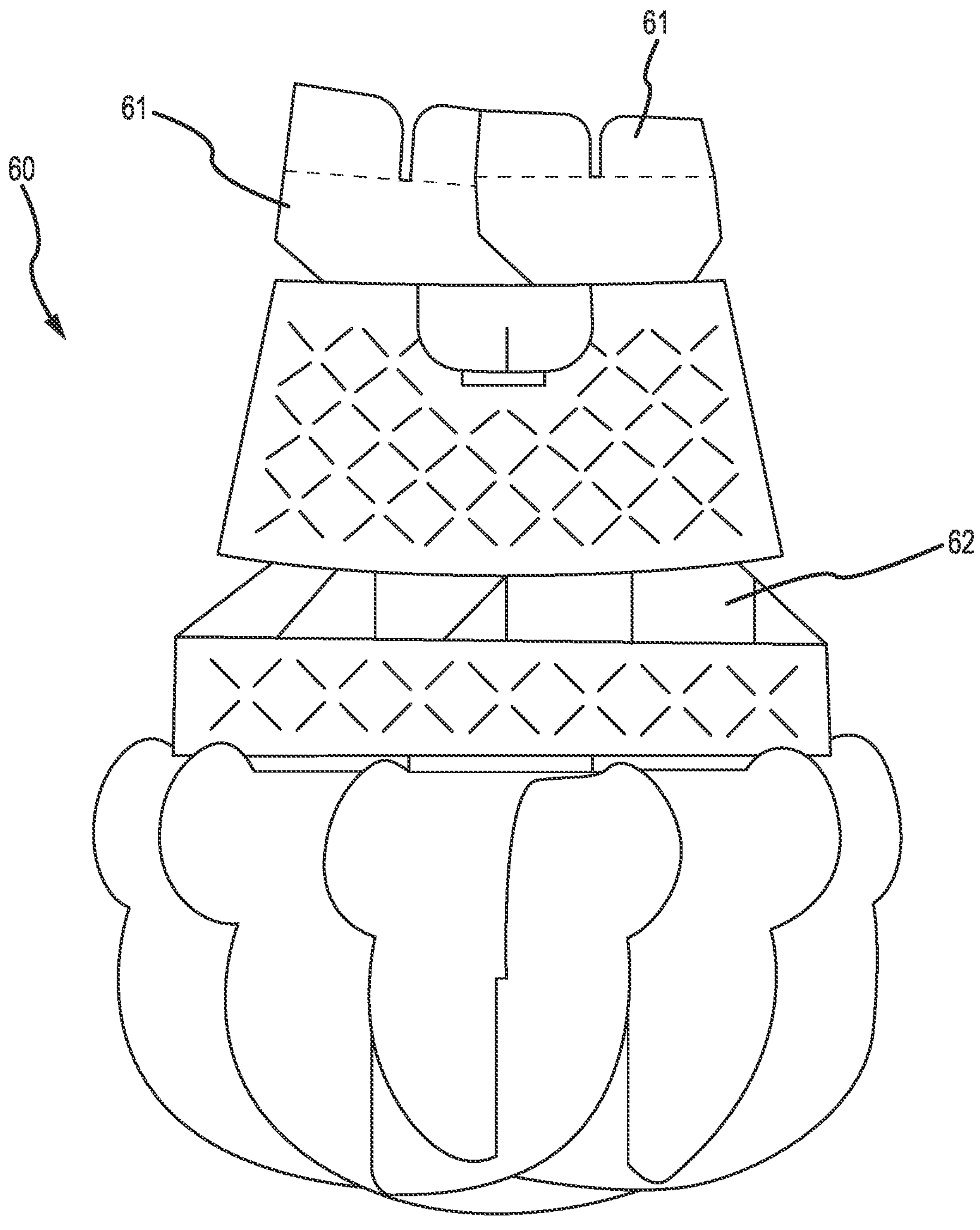
FIGS. 12A-12G illustrate a pop-up display structure having a base with locking features to maintain the pop-up display structure in the 3-D state in accordance with one or more embodiments.
Figure 12B:
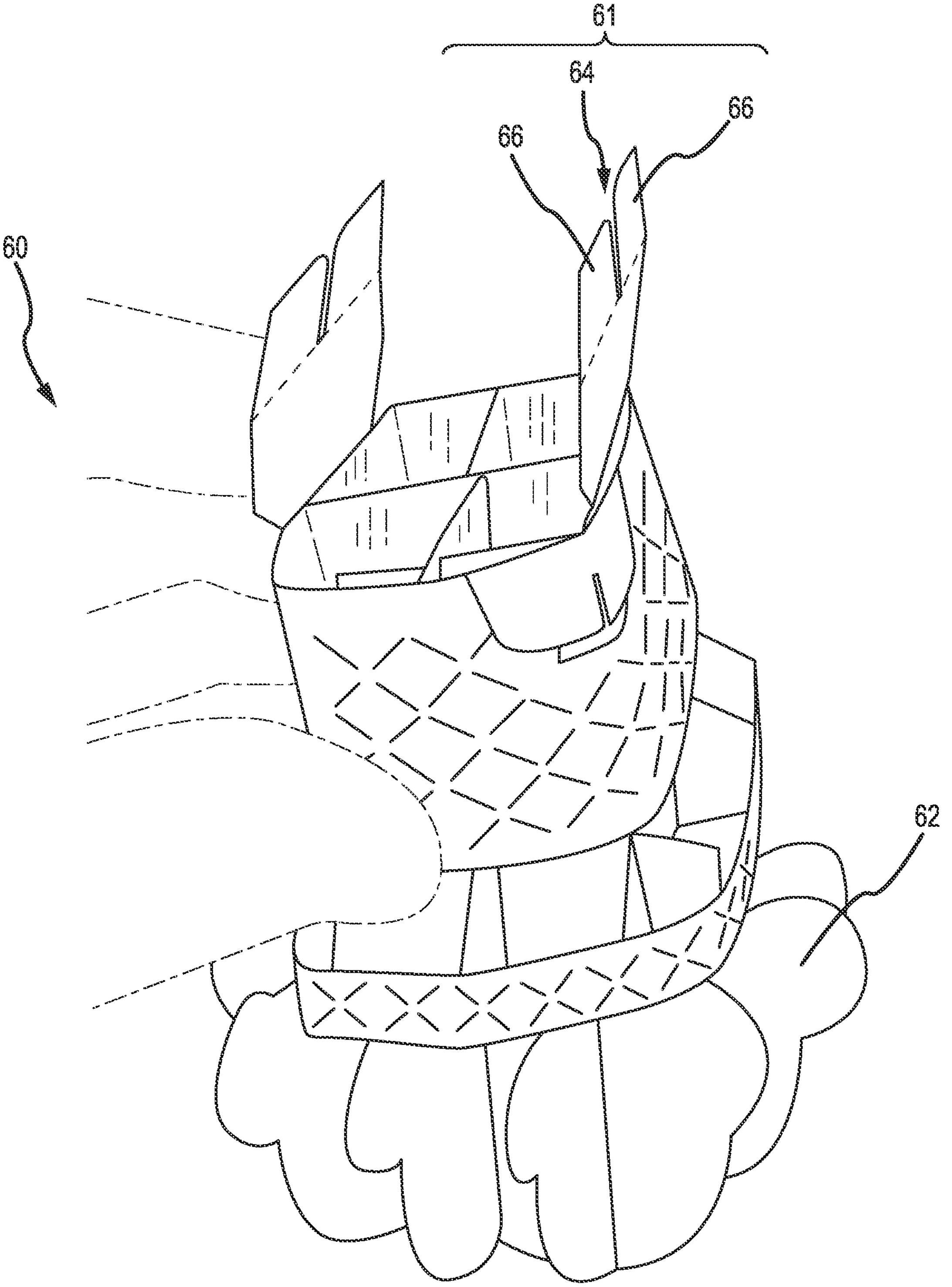
Figure 12C:
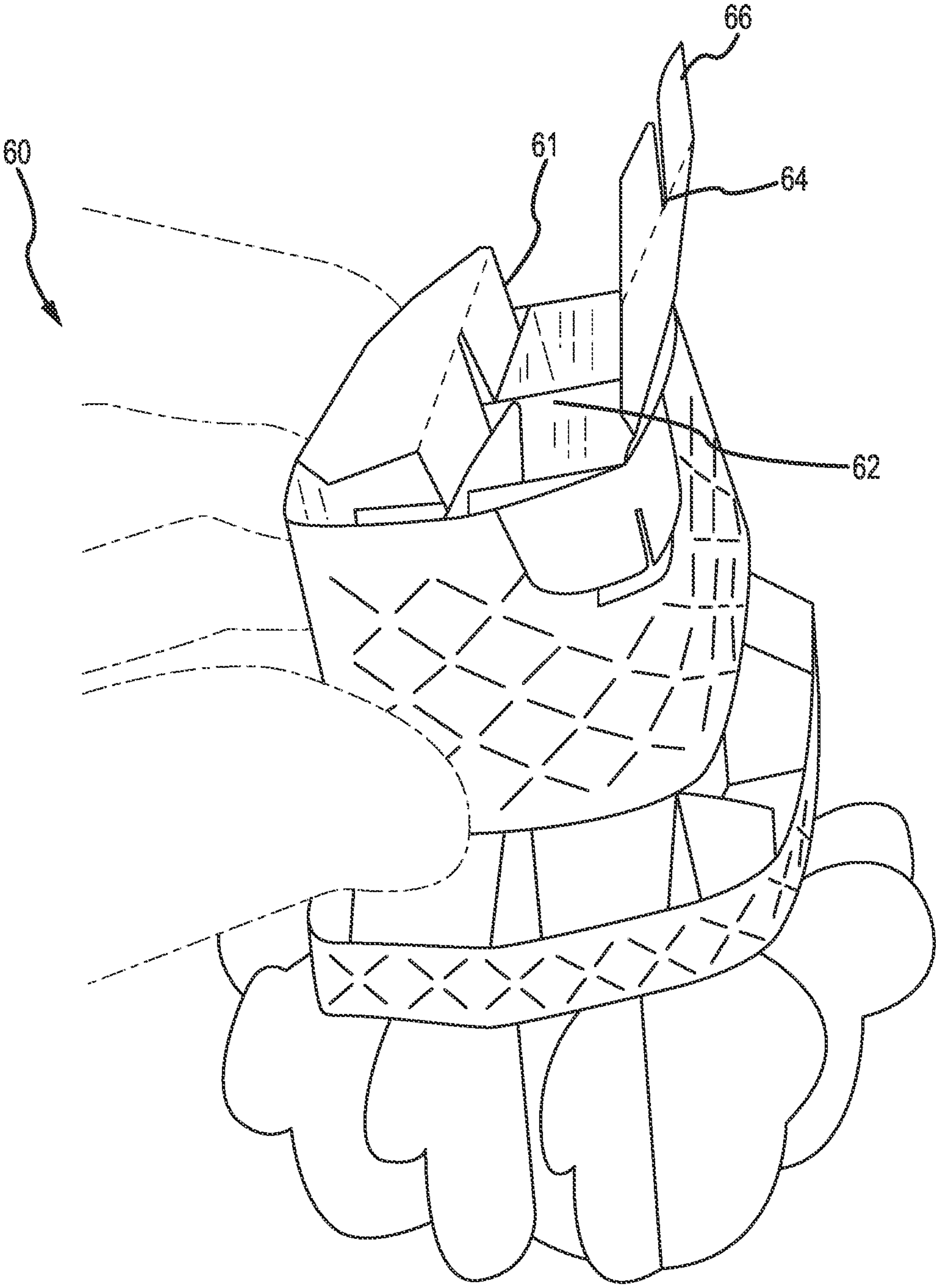
Figure 12D:
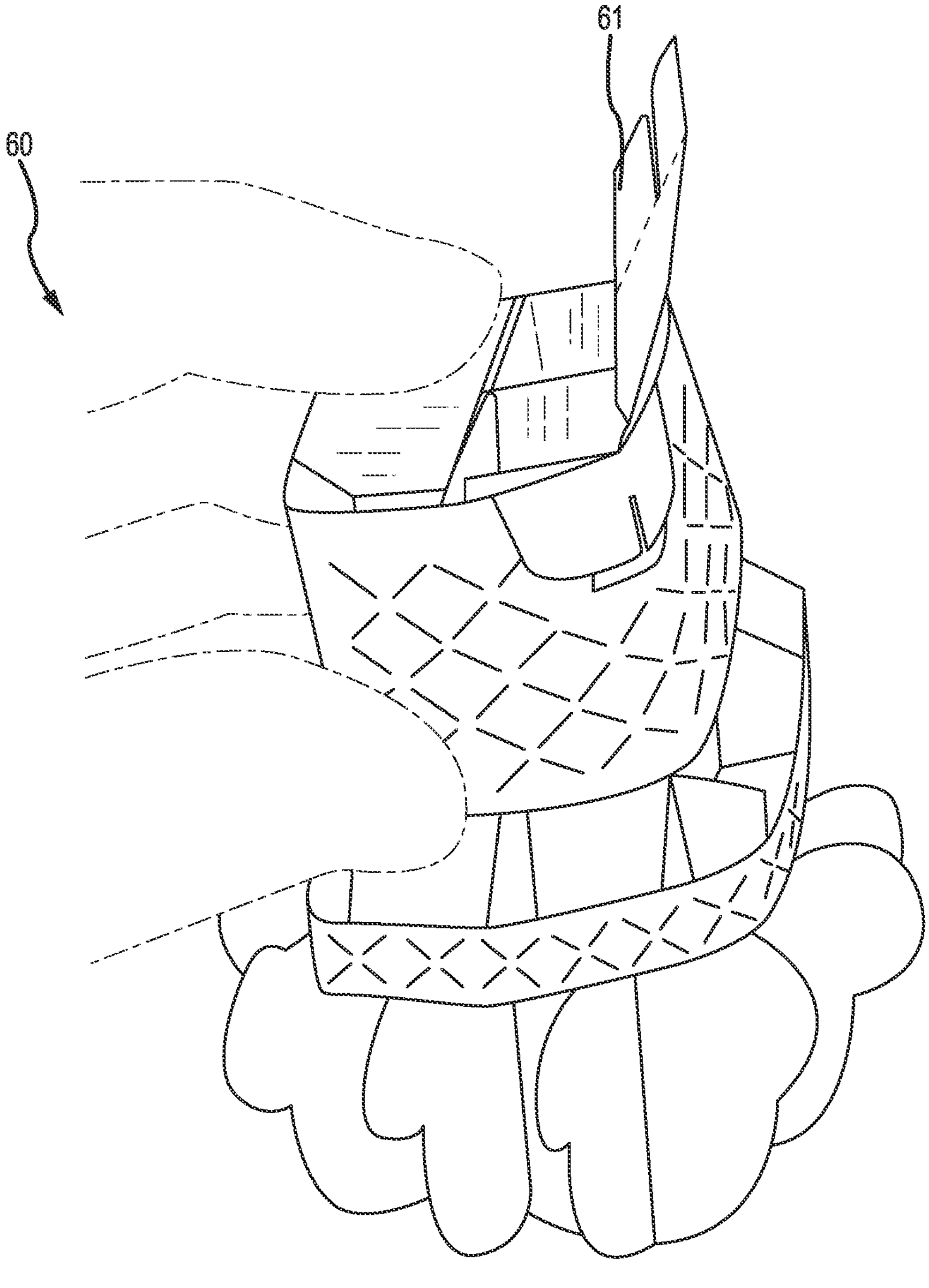
Figure 12E:
Figure 12F:
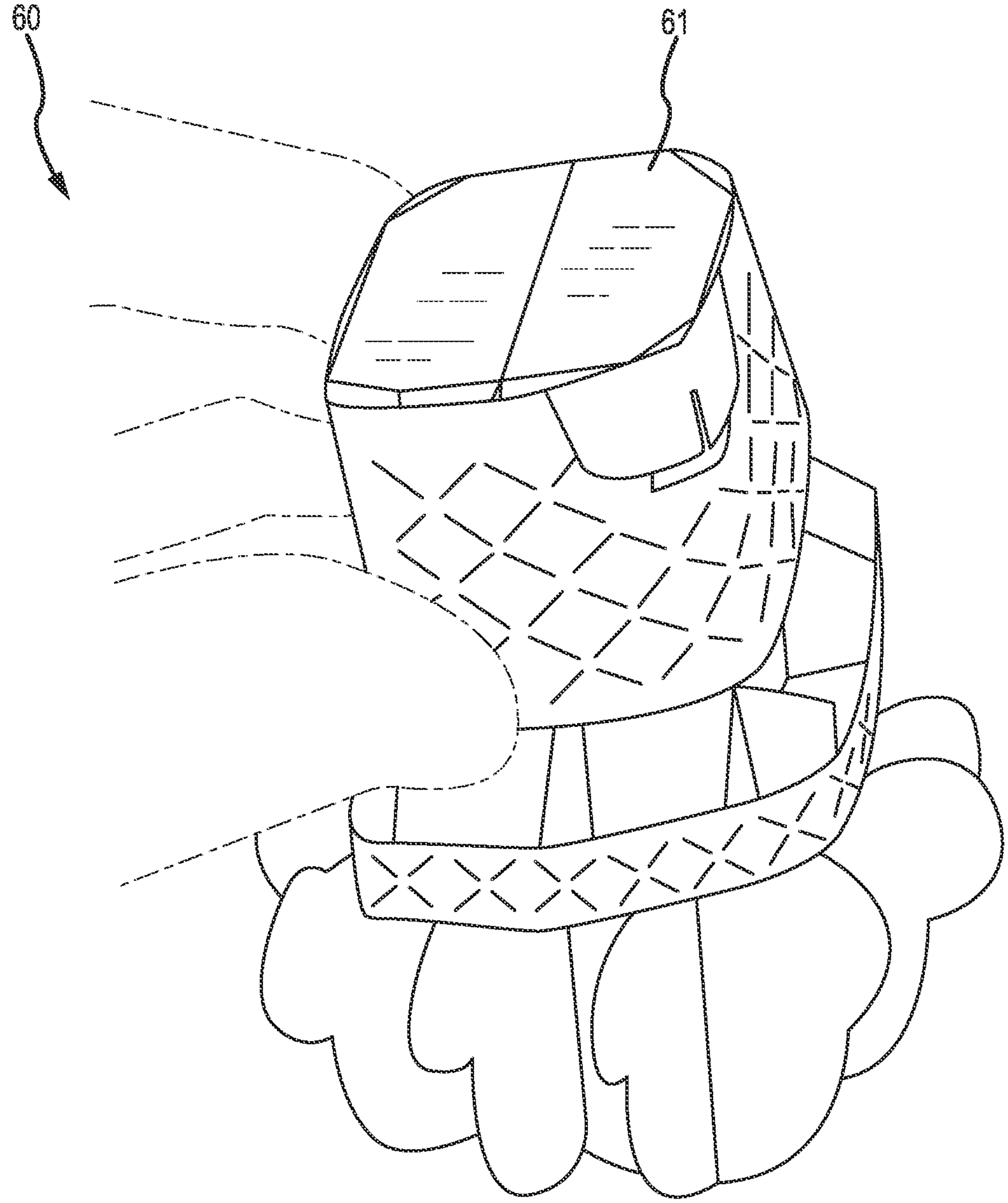
Figure 12G:
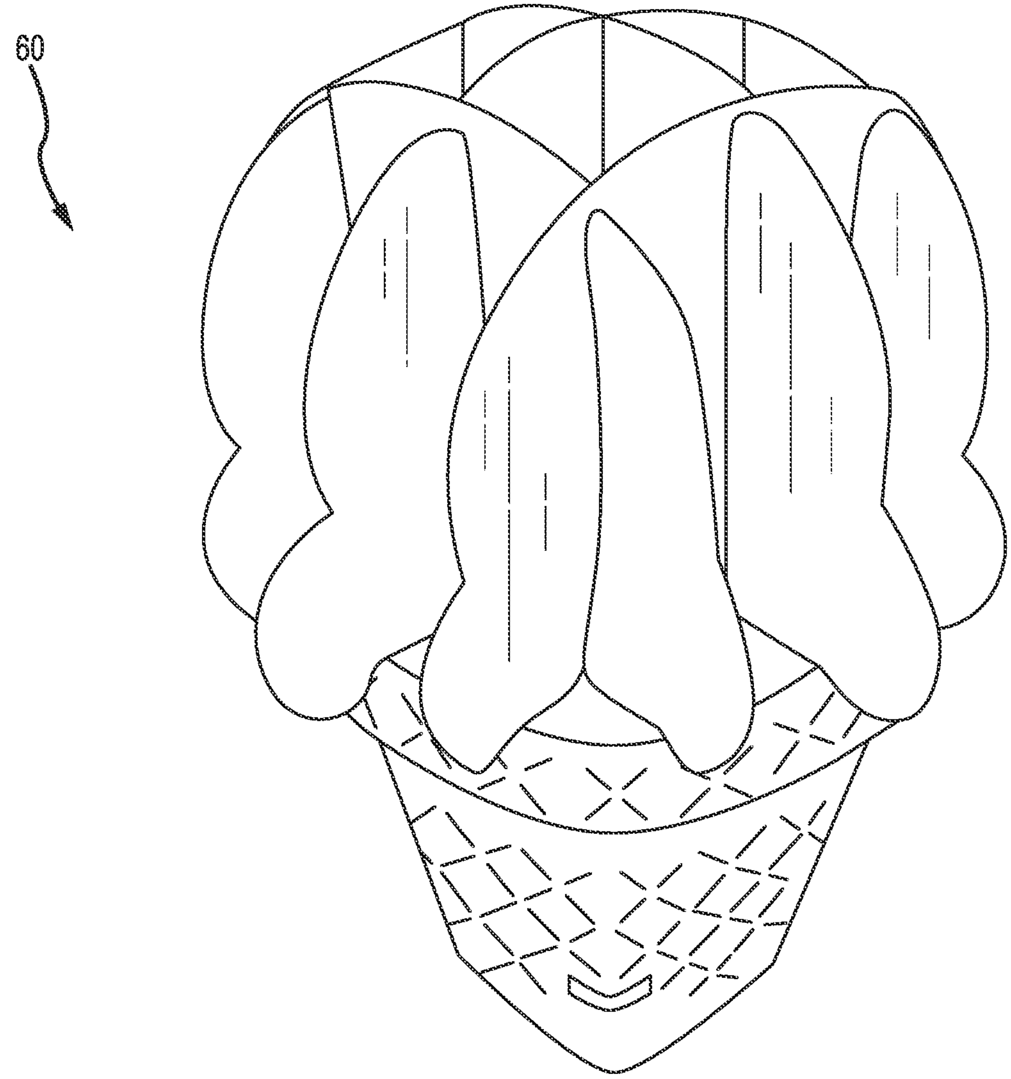

FIG. 12A shows the pop-up display structure 60 in a folded collapsed state, and FIG. 12G shows the structure 60 displayed in the erected 3-D state. FIGS. 12B-12F illustrate the process of locking the structure 60 to maintain the 3-D state.

The pop-up display structure 60 is made of a plurality of slice-form elements including intersecting slice-form elements 62. The structure 60 also includes a base having locking features 61 comprising tabs 66 that are separated by a slot 64. Referring to FIG. 12C, the locking features 61 are folded into the bottom of the structure 60 such that the slots 64 receive one of the intersecting slice form elements 62 and the tabs 66 engage adjacent slice form elements 62 to inhibit the slice form elements from collapsing, thereby maintaining the pop-up display structure in the 3-D state. FIG. 12F shows the locking features 61 completely folded into the bottom of the pop-up display structure forming a base on which the structure can be supported as shown in FIG. 12G.

Figure 13A:
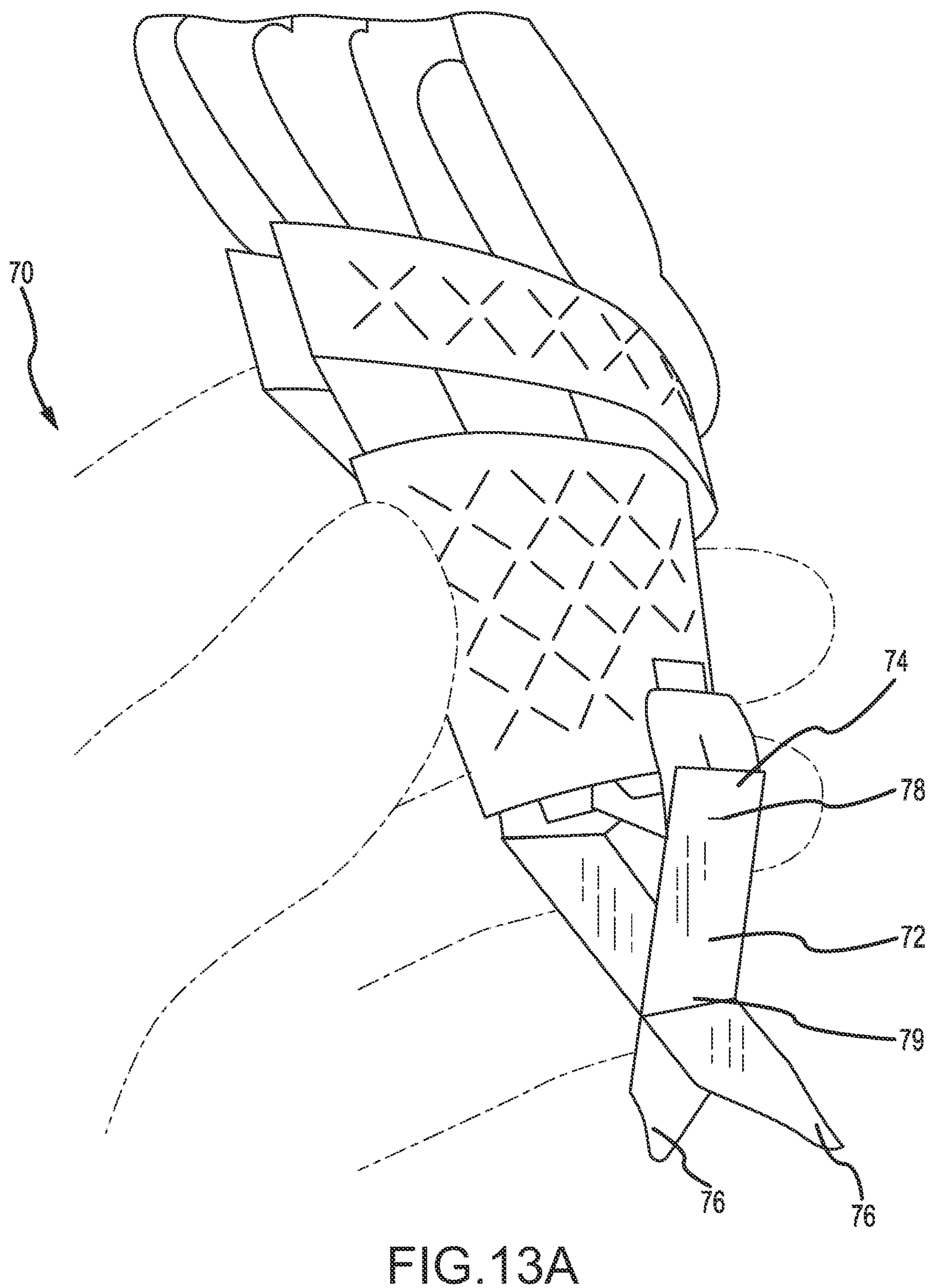
FIGS. 13A-13E illustrate a pop-up display structure having a base with alternate locking features to maintain the pop-up display structure in the 3-D state in accordance with one or more embodiments.
Figure 13B:
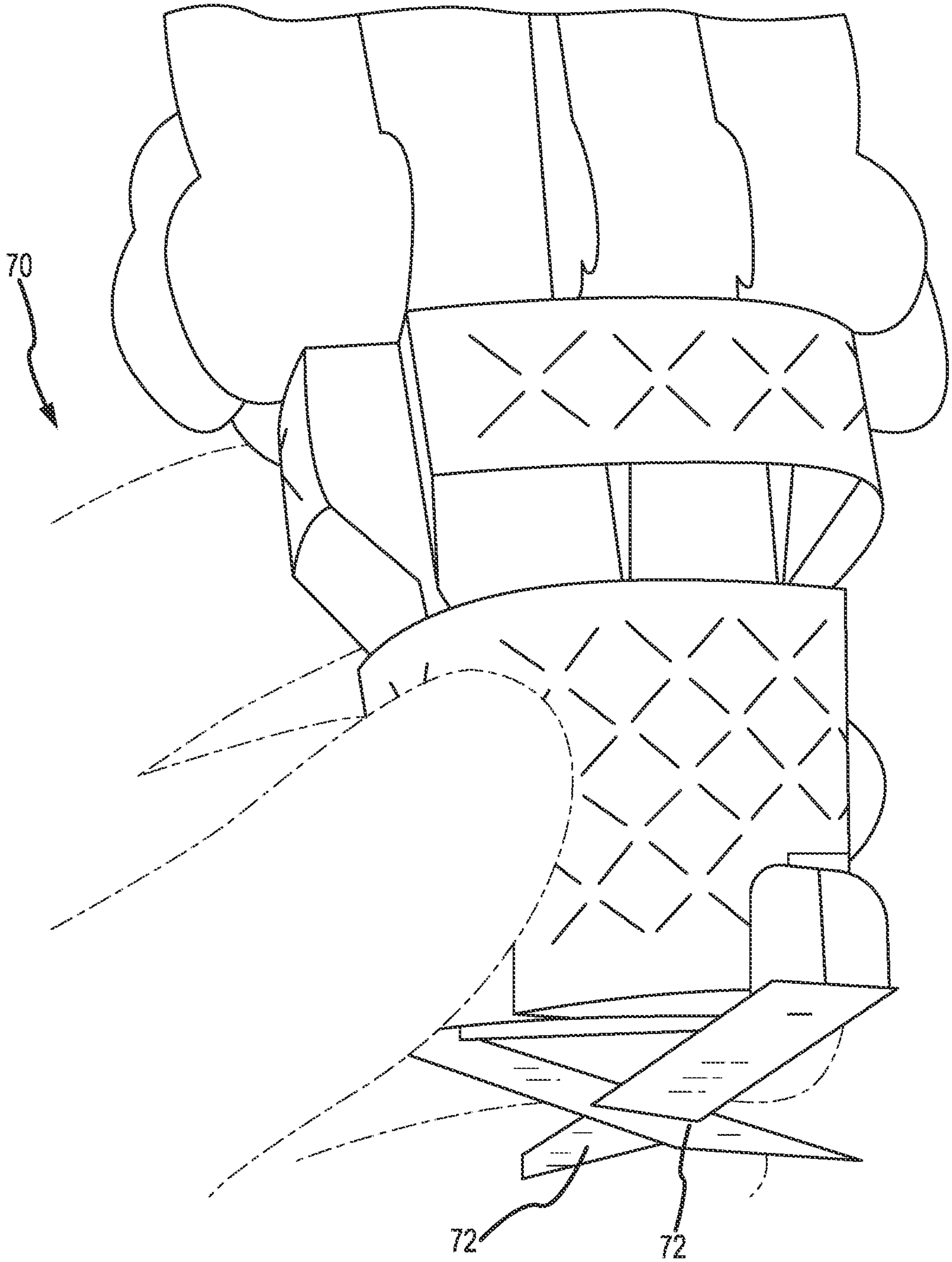
Figure 13C:
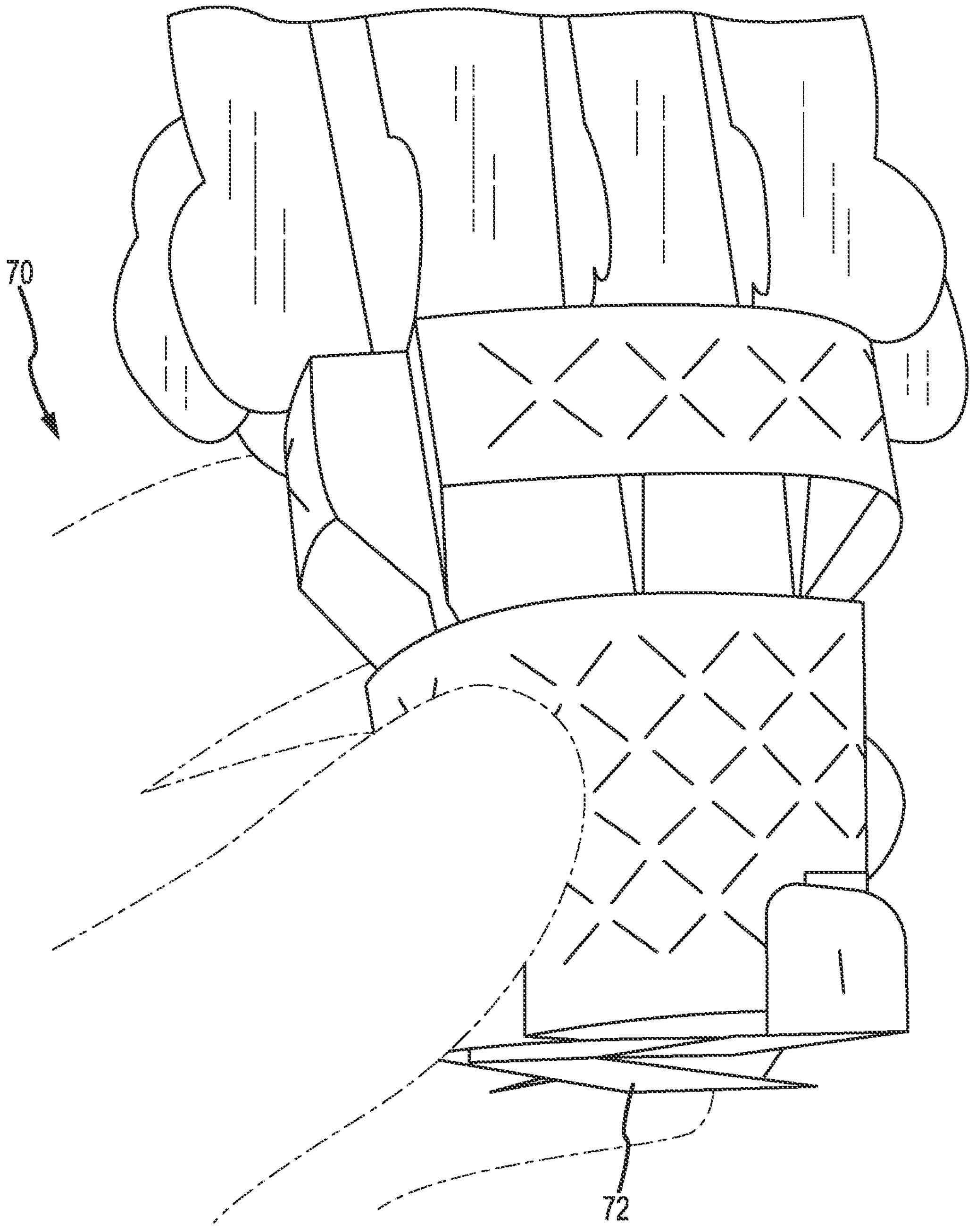
Figure 13D:
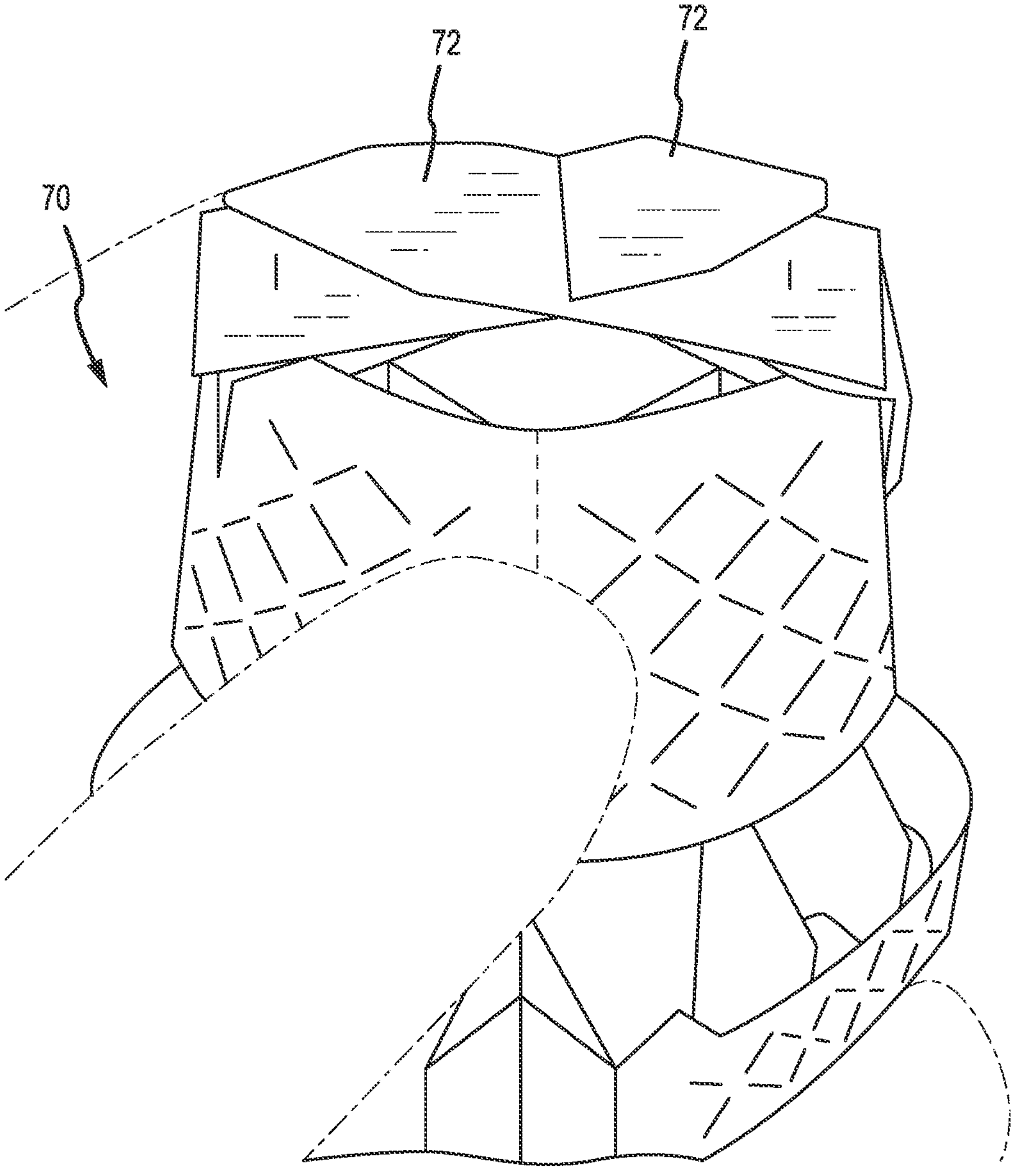
Figure 13E:
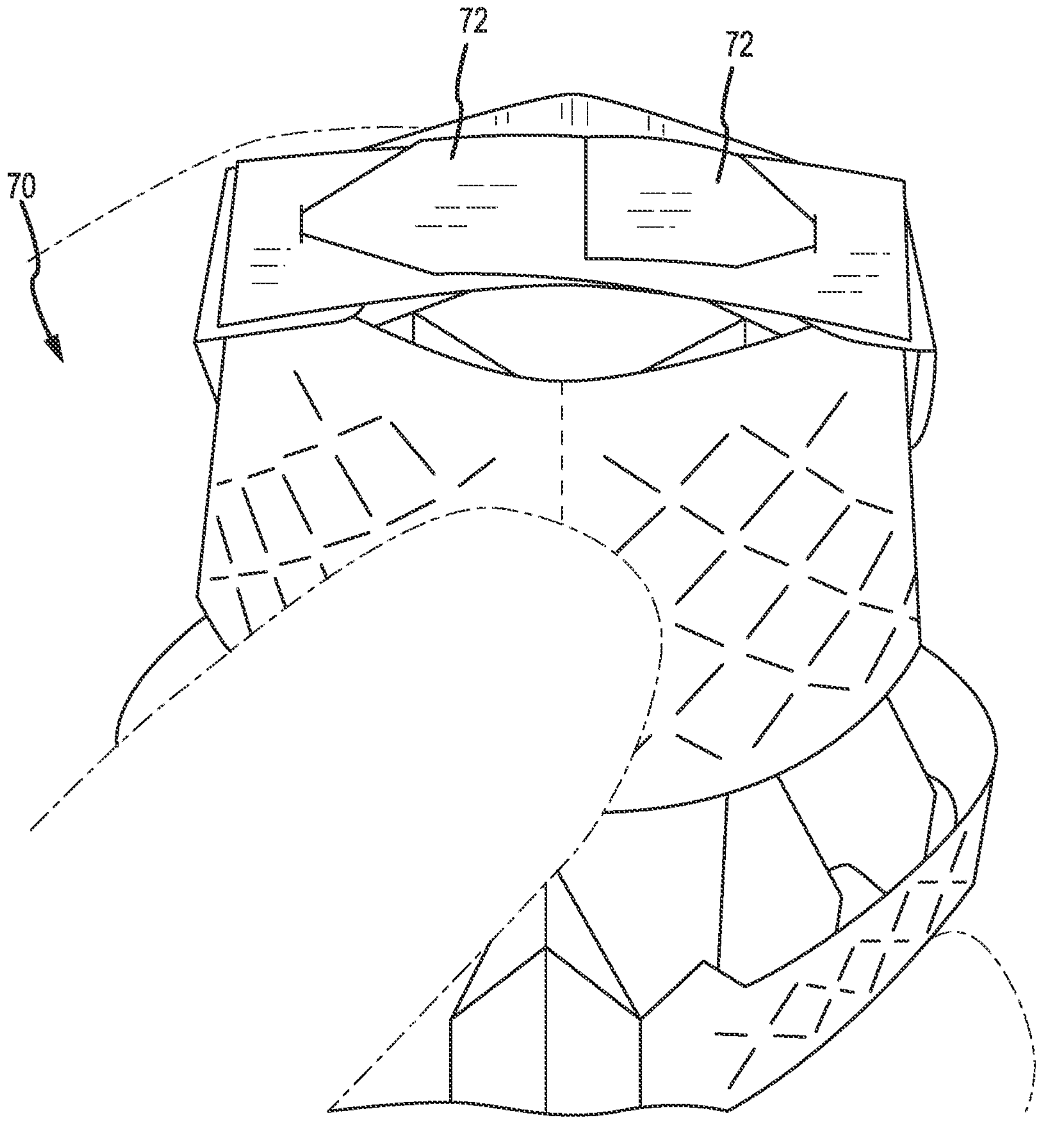

FIGS. 13A-13E illustrate an alternate embodiment pop-up display structure 70 having a base with locking features 72 to maintain the pop-up display structure in the 3-D state. The locking features 72 are each connected at a first end 74 to the bottom of the pop-up display structure 70. The opposite second free end 76 of each locking feature 72 includes a tip that is designed to be received and held in an opening 78 in the first end 74 of the other locking feature 72. Each locking feature 72 includes a slot 79 in a middle portion thereof, which interlocks with the slot in the other locking feature 72 forming a pivot enabling the locking features 72 to be unfolded in scissor-like fashion from a vertical position when the pop-up display structure is collapsed as shown in FIG. 13A to a horizontal position when the pop-up display structure is in a 3-D state as shown in FIG. 13E. The tips at the free end 76 are held in the opening 78 to securely maintain the pop-up display structure in a stable 3-D state.

The pop-up display structures 60 and 70 can be part of a pop-up card or can be sold independently.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only and are not intended to be limiting.

What is claimed is:

1. A pop-up structure comprising:

a foldable base including a top surface;

a bottom surface opposite the top surface;

a crease line defined in the foldable base, the crease line separating a first portion of the foldable base from a second portion of the foldable base;

a pop-up display structure comprising a plurality of intersecting slice-form elements, the pop-up display structure including a fold line extending in a direction parallel to the crease line;

a first portion of the pop-up display structure mounted to the first portion of the foldable base on the top surface; and a second portion of the pop-up display structure mounted to the second portion of the foldable base on the top surface, the pop-up display structure movable between a flattened state and an erected 3D state, the pop-up display structure being in the flattened state when the foldable base is in a folded position, the pop-up display structure being in the erected 3D state when the foldable base is in an unfolded position.

2. The pop-up structure of claim 1, wherein the foldable base is removable from a card.

3. The pop-up structure of claim 2, wherein the card includes an opening defined in at least one surface configured to removably hold the foldable base.

4. The pop-up structure of claim 2, wherein the foldable base is removable from a card using a tab.

5. The pop-up structure of claim 4, wherein the tab extends along the crease line.

6. The pop-up structure of claim 1, wherein the folded position includes the pop-up display structure sandwiched between the first portion and the second portion of the foldable base.

7. The pop-up structure of claim 1, wherein the unfolded position of the foldable base includes the first portion and the second portion of the foldable base extending along a plane.

8. The pop-up structure of claim 1, wherein the foldable base is receivable into a slot to maintain the foldable base in the unfolded position.

9. The pop-up structure of claim 1, wherein the foldable base is maintained in the unfolded position using a material at least partially covering the bottom surface.

10. A pop-up structure comprising:

a foldable base including a top surface;

a bottom surface opposite the top surface;

a crease line defined in the foldable base, the crease line separating a first portion of the foldable base from a second portion of the foldable base;

a card having a first side and a second side;

a fold line defined in the card, the fold line separating the first side from the second side of the card;

a pop-up display structure mounted to the foldable base on the top surface, the pop-up display structure movable between a flattened state and an erected 3D state, the pop-up display structure being in the flattened state when the foldable base is in a folded position, the pop-up display structure being in the erected 3D state when the foldable base is in an unfolded position.

11. The pop-up structure of claim 10, wherein the crease line of the foldable base extends parallel to the fold line of the card.

12. The pop-up structure of claim 10, further comprising:

an opening defined in at least one surface of the card, the at least one surface configured to removably hold the foldable base.

13. The pop-up structure of claim 12, wherein the opening is defined at least partially on the first side of the card and at least partially on the second side of the card.

14. The pop-up structure of claim 12, wherein the at least one surface extends over at least a portion of the foldable base when the foldable base is positioned in the opening.

15. The pop-up structure of claim 12, further comprising:

a tab extending from the foldable base, the foldable base being removable from the opening using the tab.

16. The pop-up structure of claim 15, wherein the tab extends along the crease line of the foldable base.

17. A method comprising:

moving a pop-up display structure from a flattened state to an erected 3D state by translating a movement of a foldable base from a folded position to an unfolded position to the pop-up display structure, the foldable base having a bottom surface opposite a top surface and a crease line separating a first portion from a second portion, the pop-up display structure connected to the top surface of the foldable base; and maintaining the pop-up display structure in the erected 3D state by maintaining the foldable base in the unfolded position, the pop-up display structure is maintained in the erected 3D state using a slot into which at least a portion of the foldable base is received.

18. The method of claim 17, wherein the pop-up display structure is maintained in the erected 3D state following a removal of the foldable base from an opening defined in a card.

19. The method of claim 18, wherein the foldable base is removed from the opening using a tab.

20. The method of claim 19, wherein the tab extends along the crease line.

* * * * *